United States Patent [19]

Ziobro

[11] Patent Number: 5,218,887
[45] Date of Patent: Jun. 15, 1993

[54] DRILL CHUCK AND REVOLVING SPINDLE GUARD

[75] Inventor: Norbert M. Ziobro, Dupont, Pa.

[73] Assignee: The United States of America as represented by the Secretary of the Army, Washington, D.C.

[21] Appl. No.: 914,676

[22] Filed: Jul. 13, 1992

[51] Int. Cl.[5] ............................................. F16P 1/00
[52] U.S. Cl. ..................................... 74/612; 74/609; 408/241 G
[58] Field of Search ..................... 74/608, 609, 612; 192/116.5, 133, 135; 408/241 G

[56] References Cited

U.S. PATENT DOCUMENTS

| 1,447,987 | 3/1923 | Johnson | 74/612 |
| 2,491,035 | 12/1949 | Deacon | 74/609 |
| 3,293,941 | 12/1966 | Schwabe, Jr. | 74/608 |
| 4,043,701 | 8/1977 | Jaeger | 408/241 G |
| 4,884,927 | 12/1989 | Menger | 408/241 G X |

FOREIGN PATENT DOCUMENTS

| 2539208 | 7/1984 | France | 408/241 G |
| 568432 | 8/1945 | United Kingdom | 408/241 G |
| 571116 | 8/1945 | United Kingdom | 408/241 G |
| 1318070 | 5/1973 | United Kingdom | 74/612 |
| 1564852 | 4/1980 | United Kingdom | 74/609 |

Primary Examiner—Rodney H. Bonck
Assistant Examiner—Ryan W. Massey
Attorney, Agent, or Firm—Anthony T. Lane; Earl T. Reichert; Werten F. W. Bellamy

[57] ABSTRACT

A drill chuck and revolving spindle guard for protecting a person operating a machine with a revolving spindle comprising: a mounting bracket for attachment about a machine part having a revolving spindle; a pawl adapted to fall into a slot in a block attached to the mounting bracket; a locking block through which a threaded shaft is disposed to permit pivoting for swinging the guard in and out of working position in relation to a work-piece; a threaded shaft around which a compression spring is spirally wound to permit height adjustment of the guard; a compression spring for holding the guard in a locked position; a locking nut disposed at a base of the threaded shaft around which the compression spring is wound to hold the guard fast after height or position adjustments; a guard bracket upon which a base portion of the nut rests; a guard having a semi-circular configuration; whereby the guard bracket is attached to an arc of the semi-circular guard so that when the guard is moved to a drill change position by an upward push on the guard bracket to lift the pawl out of the locking block, there is a pivot motion of the guard in a counterclockwise direction to cause locking of the guard in a changed position.

4 Claims, 2 Drawing Sheets

DRILL CHUCK AND REVOLVING SPINDLE GUARD

The invention described herein may be manufactured, used and licensed by or for the government for governmental purposes without the payment of any royalties thereon.

FIELD OF THE INVENTION

The invention relates to a drill chuck and revolving spindle guard for guarding a machine operator against a chuck key left in the drill chuck, broken drill bits, or drilling chips, and the guard is characterized by the flexibility of being adaptable to various drill presses and other machines with revolving spindles such as milling machines.

BACKGROUND OF THE INVENTION

Numerous attempts have been made to prevent accidents while using a drill chuck under circumstances in which a machine operator has either left the chuck key in the drill chuck or is otherwise exposed to broken drill bits or drilling chips; however, these guards have not been sufficiently effective in terms of safety to guard the machine operator because of insufficient features or means of the guard being adaptable to various types of drill presses or other machines with revolving spindles, as in the case of, for example, milling machines.

Therefore, a need exists in this area for an effective guard that has features which enable the guard to be adaptable to various types of drill presses and other machines with revolving spindles.

U.S. Pat. No. 3,785,222 discloses a safety guard for a foot-actuated control, wherein the foot control guard comprises a base, a mounting cover for the base, side guards and a front closure to prevent accidental actuation of a treadle switch. The foot control guard provides complete enclosure for the switch or valve control and the front closure of the guard opens sideways about a vertical hinge axis, so that the front closure completely blocks longitudinal foot movement into the switch enclosure and engagement by a foot moving in this direction instead tends to urge the front closure into a closed rather than an open position.

However, the guard in the foregoing patent ('222) has no capability of insulating a machine operator from drill presses or machines with revolving spindles.

SUMMARY OF THE INVENTION

One object of the invention is to provide a drill chuck and revolving spindle guard to protect a machine operator against a chuck key inadvertently left in the drill chuck.

Another object of the invention is to provide a drill chuck and revolving spindle guard having features sufficient to protect a machine operator from broken drill bits or drilling chips.

A further object of the invention is to provide a drill chuck and revolving spindle guard characterized by elements which enable the guard to be adaptable to various types of drill presses and other machines having revolving spindles.

The drill chuck and revolving spindle guard comprise: a mounting bracket for attachment about a machine having a revolving spindle; a pawl adapted to fall into a slot in a block attached to the mounting bracket; a locking block through which a threaded shaft is disposed to permit pivoting for swinging the guard in and out of working position; a threaded shaft around which a compression spring is spirally wound to permit height adjustment of the guard; a compression spring for holding the guard in a locked position; a nut disposed at a base portion of the threaded shaft around which the compression spring is wound to hold the guard fast after height or position adjustment; a guard bracket upon which a base portion of the nut rests; and a guard having a semi-circular configuration; whereby the guard bracket is attached to an arc portion of the semi-circular guard so that when the guard is moved to a drill change position by an upward motion or push on the guard bracket to lift the pawl out of the locking block, there is a pivoting motion of the guard counterclockwise to cause locking of the guard in a changed position.

DETAILED DESCRIPTION OF THE INVENTION

Figure 1:
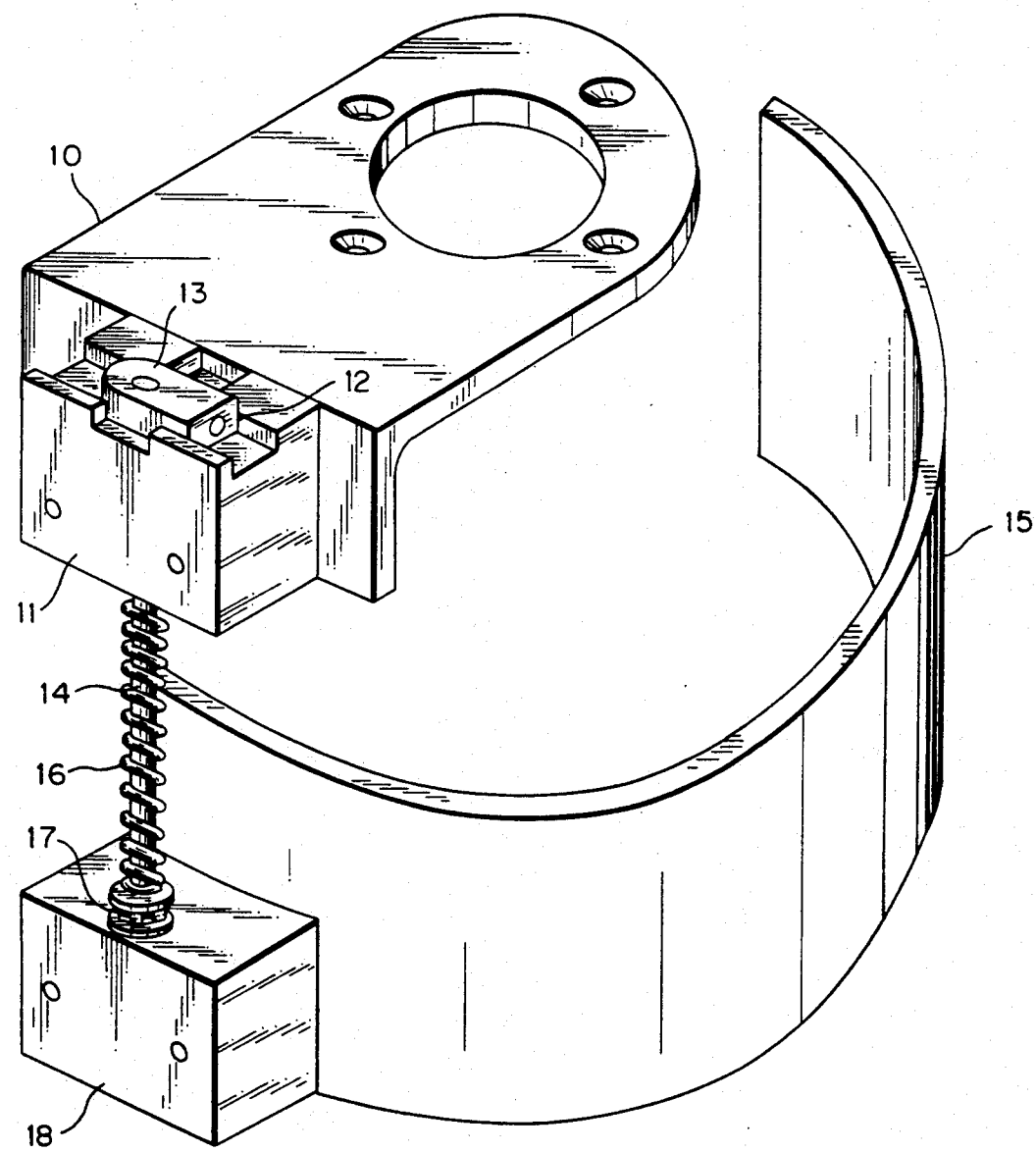
FIG. 1 is a perspective view of the drill chuck and revolving spindle guard.
Figure 2:
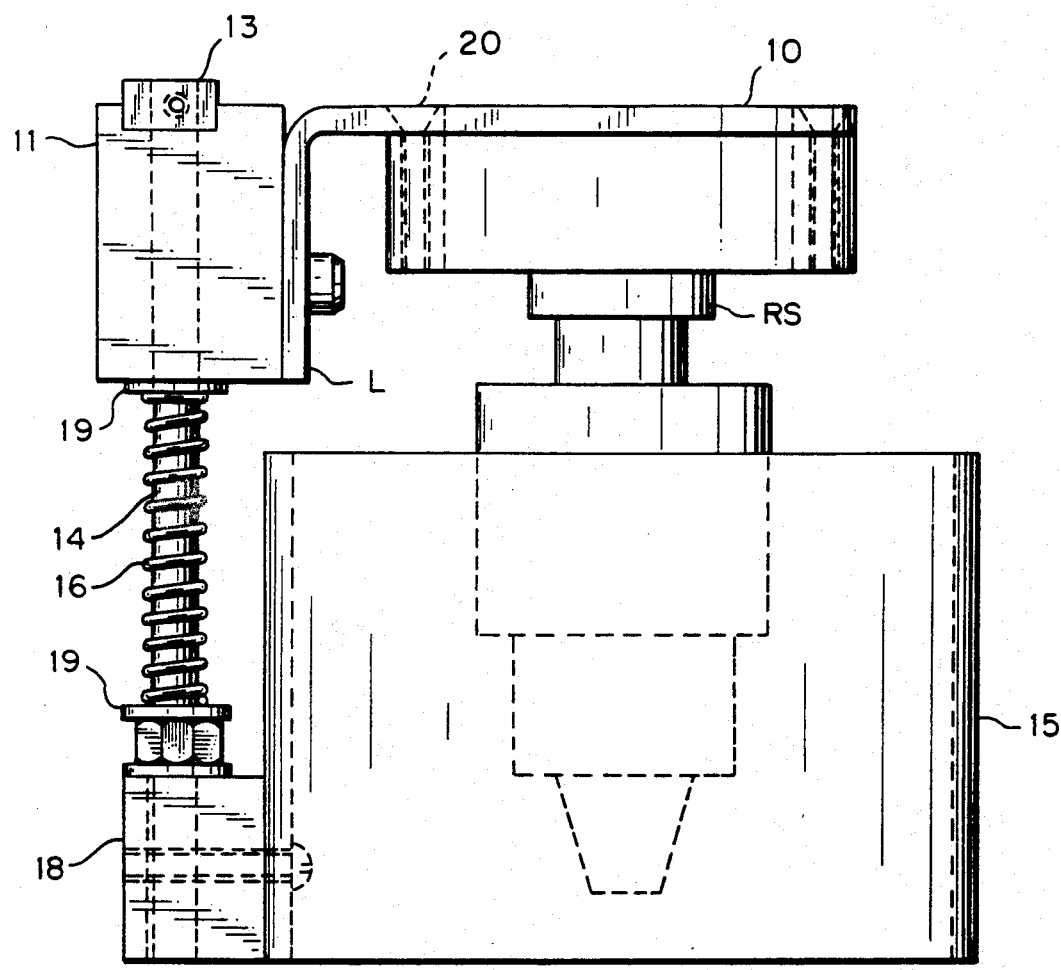
FIG. 2 is a front view of the drill chuck and revolving spindle guard.

In referring to FIG. 1, it can be seen that the drill chuck and revolving spindle guard for protecting a person operating a machine against being struck by a chuck key inadvertently left in the drill chuck, broken drill bits or drilling chips includes a mounting bracket 10 for attachment about a machine part having a revolving spindle RS as may best be seen from FIG. 2. The mounting bracket is attached (via bolting) to a pivot in position locking block 11 containing a slot 12 in which a pawl 13 is adapted to be positioned so as to permit motion in only one direction.

The locking block has an opening to accommodate a portion of a threaded shaft 14 to permit pivoting for swinging the guard 15 in and out of working position while the operator is working on the work-piece. The threaded shaft has a compression spring 16 spirally wound thereabout to permit height adjustment of the guard 15, and the compression spring exacts a bias for holding guard 15 in a locked position.

A locking nut 17 is disposed at the base of the threaded shaft around which the compression spring is wound in order to hold the guard 15 fast in place after the proper height or proper position adjustment is made by the machine operator. The bottom of the locking nut rests on a guard bracket 18, and the interior portion of the guard bracket is disposed in the configuration of an arc in fixed attachment (via bolting) to guard 15.

It should be noted that guard 15 is preferred to be in a semi-circular configuration, and the invention contemplates using a synthetic material of a plastic or rubbery nature or LEXAN ®.

FIG. 2 depicts a front view of the drill chuck and revolving spindle guard, and shows the mounting bracket in attachment about a machine part having a revolving spindle, designated by RS.

At opposite ends of the compression spring, a pair of washers 19 are biased against the pivot and position locking block 11 and the locking nut 17.

In the context of the preferred embodiment of the invention, it is preferred to have disposed in mounting bracket 10, four drill sinks 20 to accommodate flathead screws. Further, as can best be seen from FIG. 2, it is preferred to have the pivot and position locking block 11 bolted to the leg portion L of the mounting bracket. Similarly, as may also be seen from FIG. 2, in the preferred embodiment of the invention, it is preferred to have the guard bracket 18 bolted to one end of LEXAN ® guard 15.

In operation, the guard bracket is attached to an arc of the semi-circular guard so that when the guard is moved to a drill change position by an upward motion or push on the guard bracket in order to lift the pawl out of the locking block, there is a pivoting motion of the guard in a counterclockwise direction in order to cause locking of the guard in the changed position.

In order to reverse the procedure for operating the drill chuck and revolving spindle guard of the invention, and return it to the operating position, the height is adjusted by loosening locking nut 17 and pushing up on guard bracket 18 in order to turn locking pawl 13 for purposes of raising or lowering the guard. After the guard is raised or lowered, it is only necessary to then tighten locking nut 17 in order to return to the initial position.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A drill chuck and revolving spindle guard for protecting a person operating a machine with a revolving spindle comprising:

a) a mounting bracket for attachment about a machine part having a revolving spindle;
b) a pawl adapted to fall into a slot in a locking block attached to said mounting bracket;
c) a threaded shaft is disposed through said locking block to permit pivoting for swinging said guard in and out of working position in relation to a workpiece;
d) a compression spring is spirally wound around saided threaded shaft to permit height adjustment of said guard;
e) said compression spring for holding said guard in a locked position;
f) a locking nut disposed at a base of said threaded shaft around which said compression spring is wound to hold said guard fast after height or position adjustments;
g) a guard bracket upon which a base portion of said nut rests; and
h) said guard having a semi-circular configuration; whereby said guard bracket is attached to an arc of said semi-circular guard so that when said guard is moved to a drill change position by an upward push on said guard bracket to lift said pawl out of said locking block, there is a pivot motion of said guard in a counterclockwise direction to cause locking of the guard in a changed position.

2. The drill chuck and revolving spindle guard of claim 1, wherein a leg portion of said mounting bracket is bolted to said pivot and position locking block, and wherein said guard bracket is attached by an inner portion thereof to an arc at an end portion of said guard by bolting.

3. The drill chuck and revolving spindle guard of claim 2, wherein said mounting bracket contains counter-sink slots for flathead screws.

4. The drill chuck and revolving spindle guard of claim 3, wherein said guard is made of LEXAN ®.

* * * * *